Aug. 28, 1956
E. A. WILCKENS ET AL
2,760,678
ARTICLE HANDLING APPARATUS
Filed July 2, 1951
7 Sheets-Sheet 6
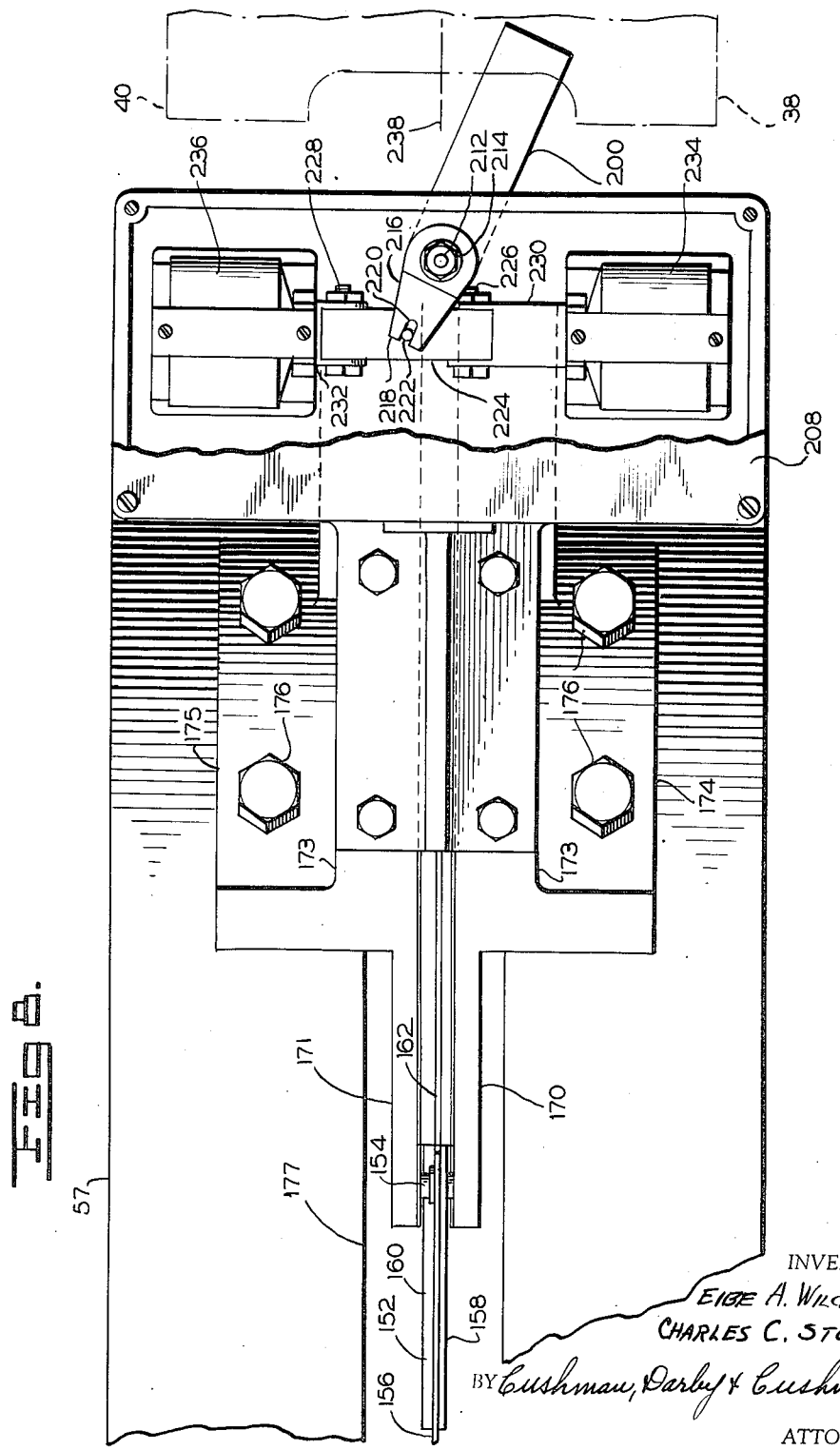
INVENTORS
*EIGE A. WILCKENS*
*CHARLES C. STOLL*
BY *Cushman, Darby & Cushman*
ATTORNEY

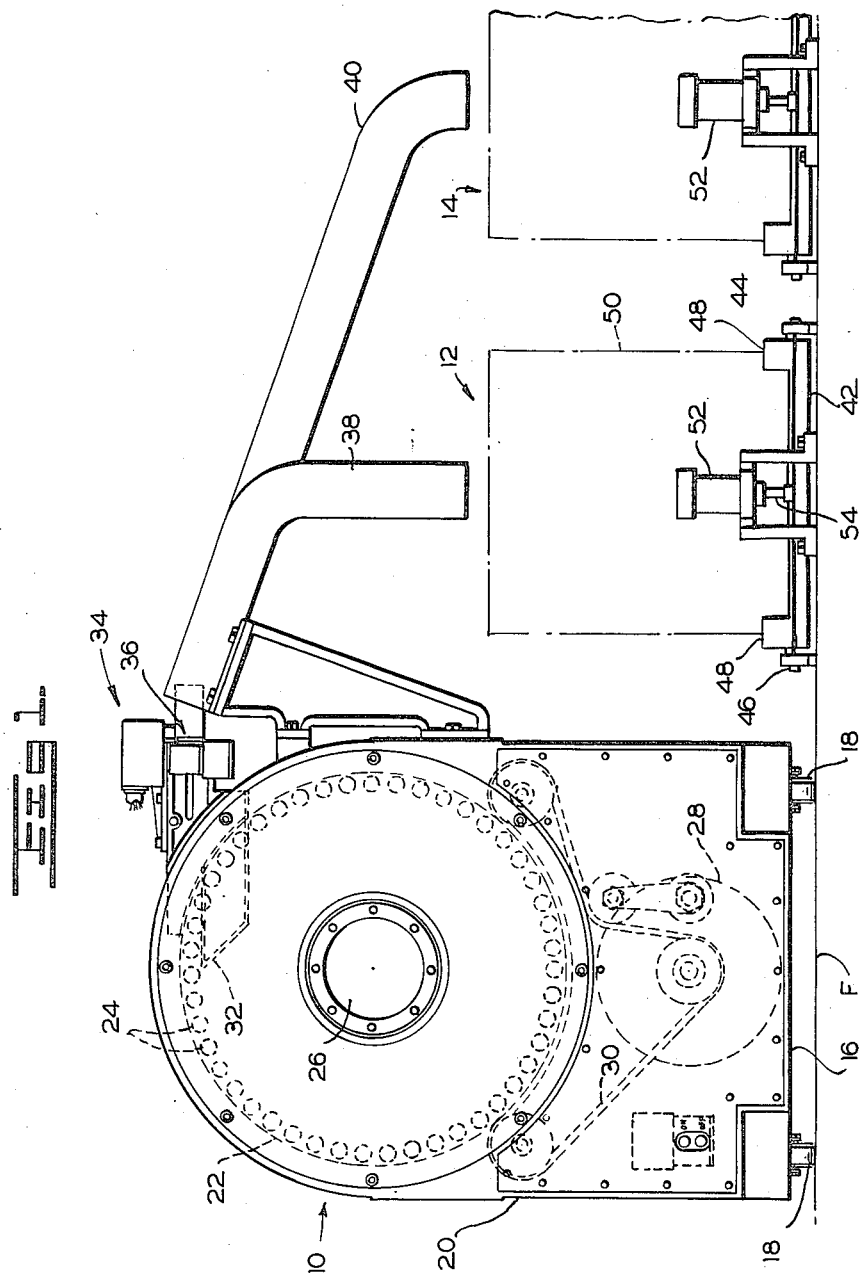

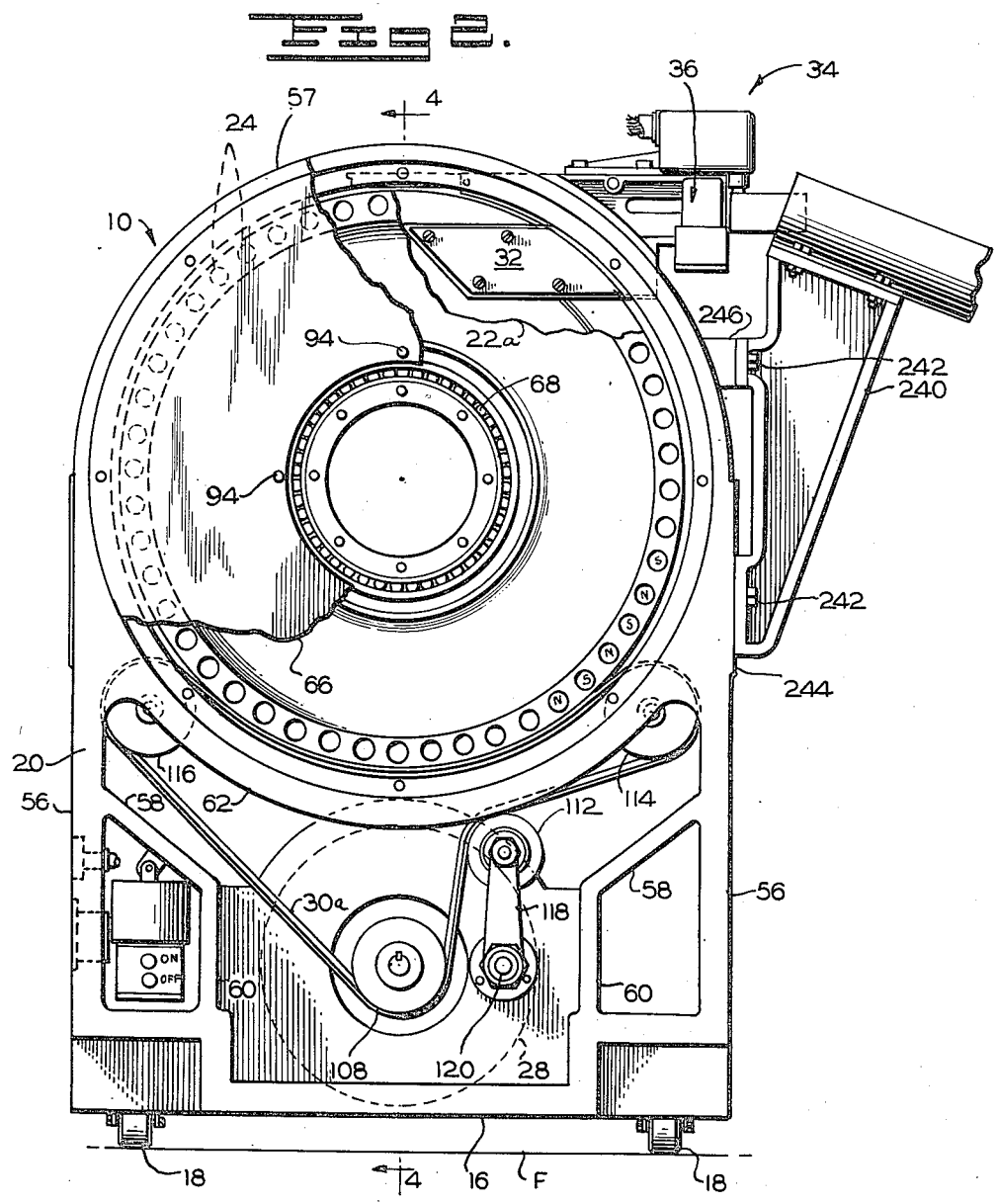

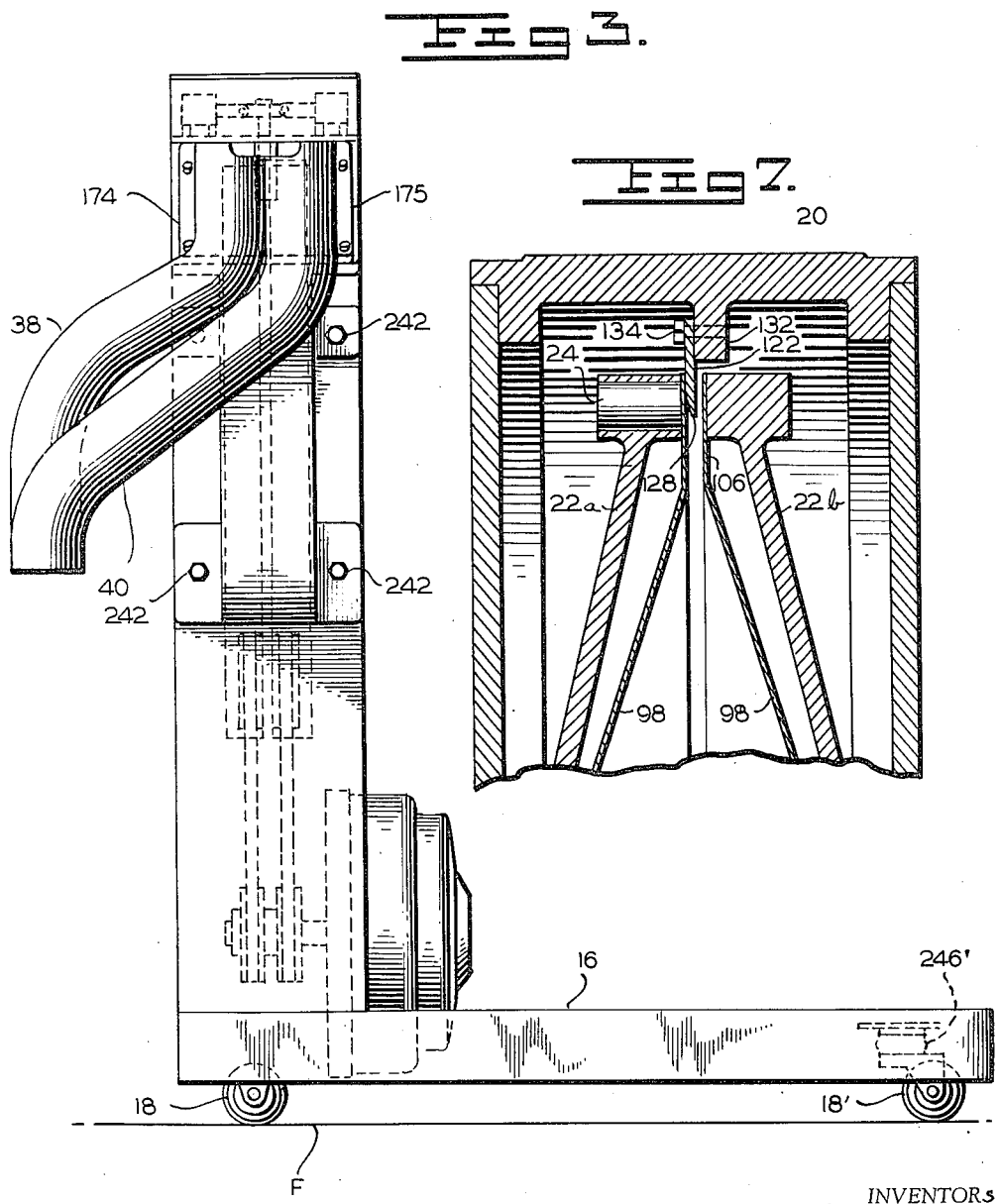

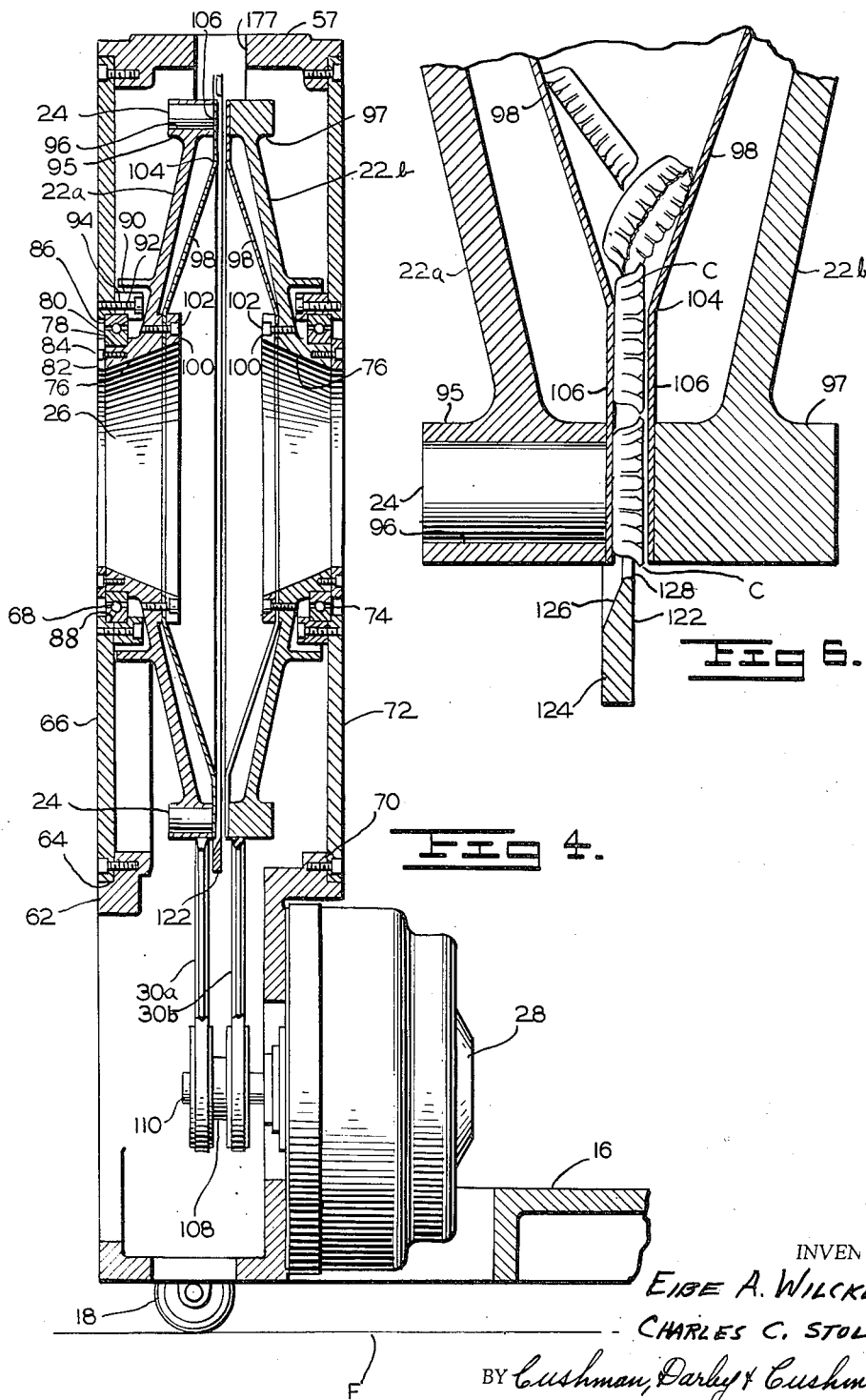

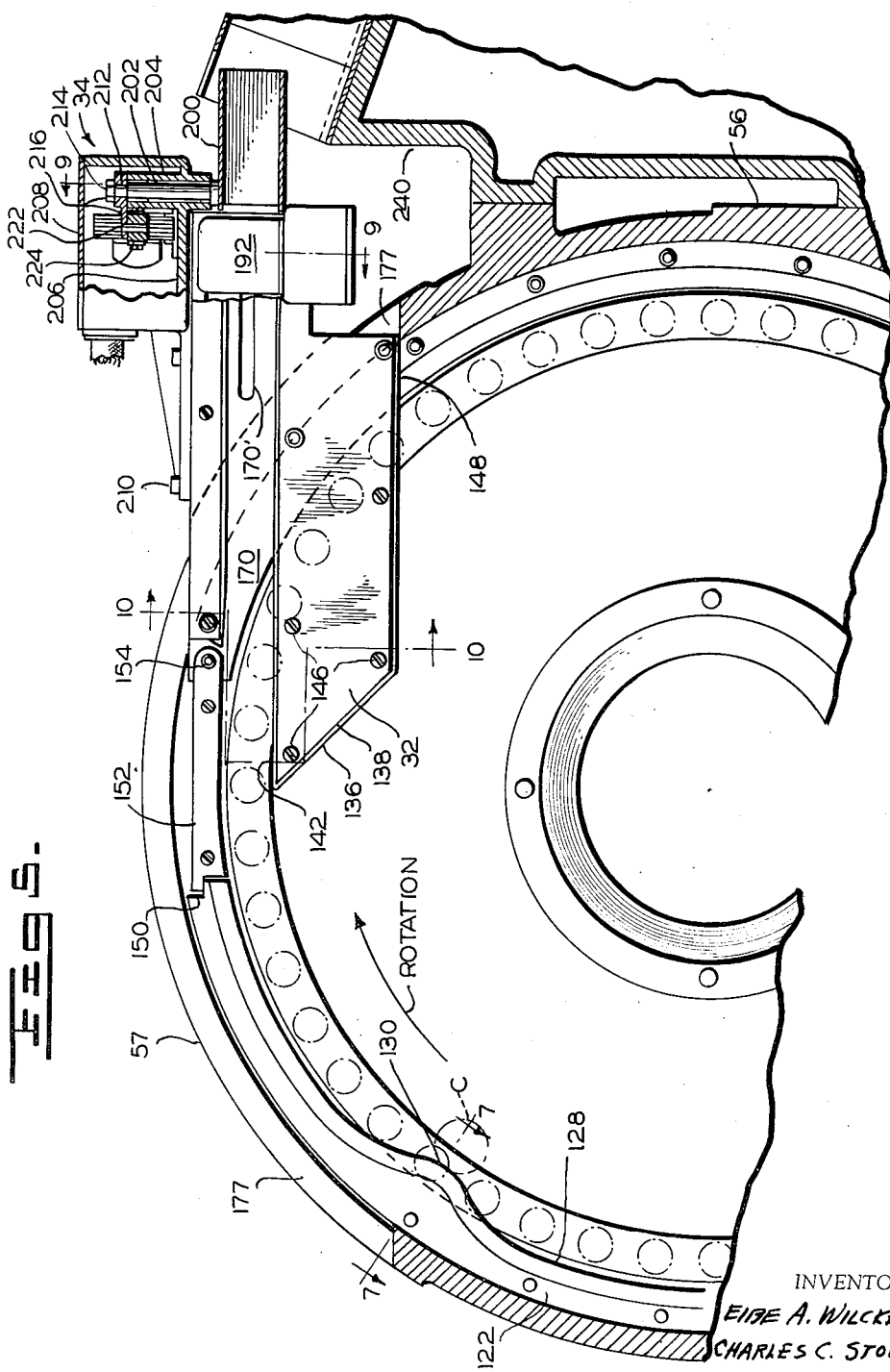

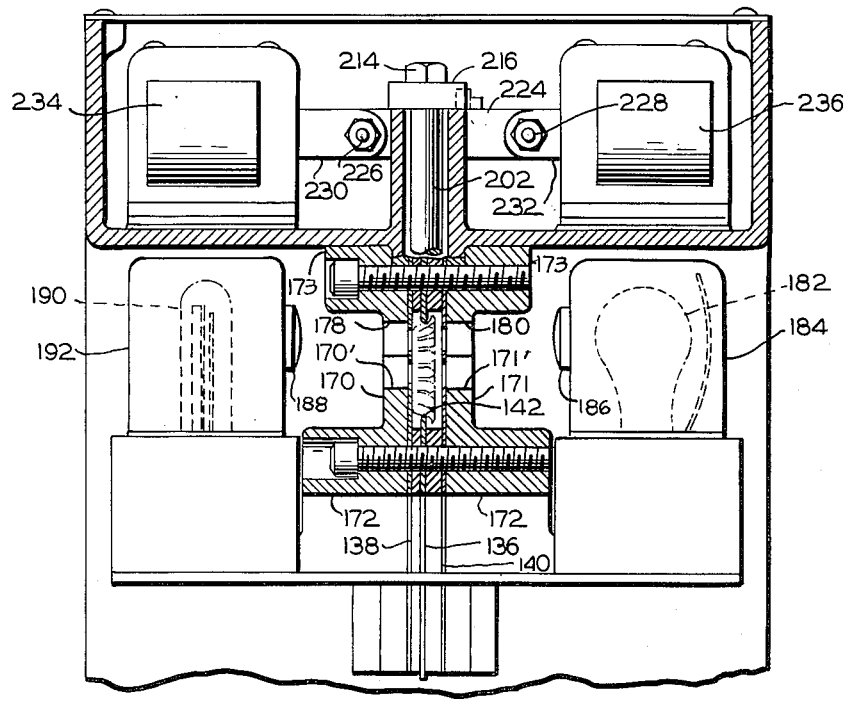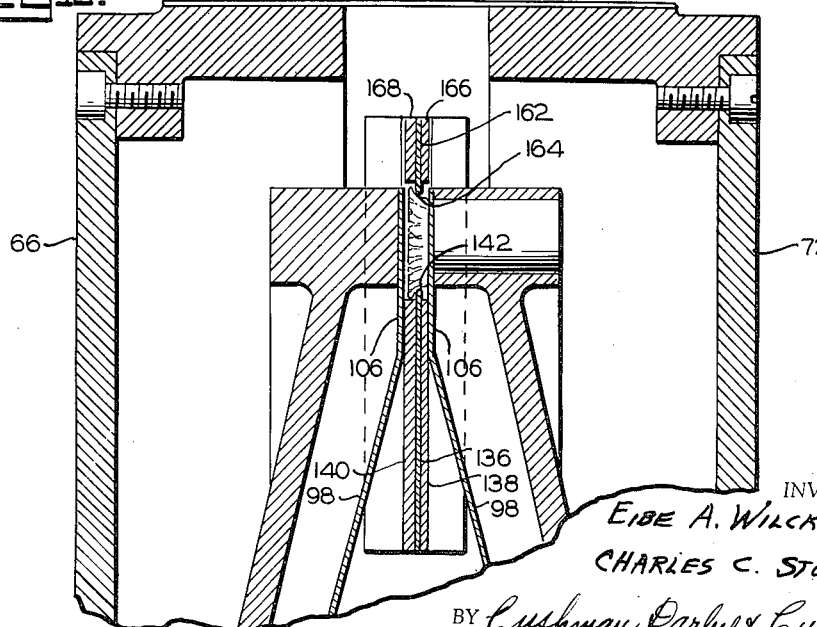

United States Patent Office 2,760,678
Patented Aug. 28, 1956

2,760,678

ARTICLE HANDLING APPARATUS

Eibe A. Wilckens and Charles C. Stoll, Baltimore, Md., assignors to Crown Cork & Seal Company, Inc., Baltimore, Md., a corporation of New York Application July 2, 1951, Serial No. 234,871

11 Claims. (Cl. 221—212)

The present invention relates to an article handling apparatus and, more particularly, to an article handling apparatus including mechanism to selectively direct counted numbers of articles to shipping receptacles.

In the manufacture of numerous types of articles it is desirable that a predetermined number of articles be packed in each shipping receptacle, and also that the articles be automatically guided to empty receptacles whenever a given receptacle is filled.

It is a principal object of the present invention to provide an apparatus which will fulfill the above requirements; that is, will include means for automatically directing the proper number of articles to shipping or packing receptacles. The invention is applicable to the handling of numerous types of articles. In the embodiment shown in the accompanying drawings, the apparatus is illustrated as handling container caps of the crown type and for convenience in the following description of the apparatus, the articles handled frequently are referred to as caps. However, this is not intended to limit the invention to caps alone.

The article handling and guiding apparatus according to the present invention is extremely useful in that provision is made so that the apparatus may be portable and further that the caps or other articles to be handled may be introduced into the apparatus from either side thereof. This is a point of considerable significance inasmuch as the article assembling apparatus from which articles are obtained may sometimes be suited for cooperation with the apparatus of the present invention from one side or the other. Moreover, it may be that two article assembling apparatus may be so positioned that the articles flowing therefrom can be directed to a common point at which the handling apparatus of the present invention may be located. That is, two adjacent assembling machines may have chutes which direct the articles into opposite sides of the present handling apparatus.

The apparatus according to the present invention is a further improvement over known arrangements in that a rotatable hopper which collects and assembles the articles into a flow line is completely free of internal structural elements to interfere with the movement of the articles.

In the apparatus of the present invention the articles are arranged for being counted by being caused to flow in single line formation so that a light beam may be interrupted and restored during the passage of each article to operate an electronic-type counter.

It is therefore another object of the invention to provide a mechanism for positioning a mass of articles in single line formation and with each article in the desired bodily position for movement to interrupt the light beam of a counting means or other means which is to perform an operation upon the articles.

No particular counting arrangement for cooperation with the above mentioned light beam is described in this application because any of a number of known counting circuits may be employed. However, a novel counting and controlling circuit particularly useful with the apparatus of the present invention is described and claimed in copending patent application Serial No. 234,872 of Eibe A. Wilckens and William W. Ackerman, filed of even date herewith and entitled Article Handling and Counting Apparatus.

Further objects and the entire scope of the invention will become apparent from the following detailed description and from the appended claims. It will be understood that the detailed description is given only for purposes of illustration and is not intended to limit the invention.

The invention may be best understood with reference to the accompanying drawings in which:

Figure 1 is a front elevational view of the apparatus of the present invention and further including means for holding and shaking receptacles to be filled.

Figure 2 is a front elevational view of the article handling and guiding apparatus which is the subject of the present invention.

Figure 3 is a side elevational view of the apparatus of Figure 2.

Figure 4 is a sectional view taken substantially along the line 4—4 of Figure 2.

Figure 5 is a detail view partly in section of the upper portion of the apparatus shown in Figure 2.

Figure 6 is a sectional view showing a detail of a rotatable hopper.

Figure 7 is a sectional detail view taken along the line 7—7 of Figure 5.

Figure 8 is a plan view of a gate unit.

Figure 9 is a sectional view taken along line 9—9 of Figure 5.

Figure 10 is a sectional view taken along line 10—10 of Figure 5.

The general operation of the apparatus illustrated in the drawings is that the articles are poured into an opening in the handling apparatus and are subsequently delivered through chutes to shipping receptacles which are mounted on platforms which are adapted to be periodically vibrated to settle the articles in the receptacles. Two or more receptacles are provided and the flow of caps into the respective receptacles is determined by a gate unit which is responsive to the passing of a predetermined number of caps to divert the flow into another receptacle. The invention being claimed in this application relates to the cap handling mechanism including structural features employed to facilitate the interruption of the light beam for counting, and also structural features of a means for guiding the flow of caps. Another invention, relating to the use of the just mentioned apparatus or similar apparatus in a system for counting caps, guiding their flow to various receptacles and periodically shaking the receptacles, is claimed in the above mentioned copending application.

Referring to Figure 1 the general structural arrangement of apparatus according to the invention is shown. The arrangement in Figure 1 includes a portably mounted article handling mechanism 10 and receptacle holding units 12 and 14.

The handling mechanism 10 is mounted on a base 16 which is supported above the floor F by means of rollers 18. Mounted on an upstanding framework 20 extending from the base 16 is a rotatable cap collecting hopper 22 outlined in Figure 1 by a dash line. A plurality of permanent magnets 24 are mounted for rotation with the hopper 22 and serve to attract and retain caps. The caps to be counted are introduced to the hopper 22 through an axial opening 26, this opening extending completely through the hopper so that caps may be introduced from either side of the mechanism. Caps introduced through opening 26 will fall to the lower part of the hopper and will there be tumbled until in position to be attracted and retained by the magnets 24. The hopper 22 is rotated clockwise as viewed in Figure 1 by means of a motor 28 and belting 30 and the caps will move with the magnets 24 until removed from the magnets by means of an ejector blade assembly 32. Thereupon the caps move in a horizontal direction through a gate unit designated generally as 34. Adjacent the unit 34 there is provided a lamp-photocell arrangement designated as 36 which is so positioned that the caps issuing from the magnets interrupt a light path once for every cap, and a photocell circuit responsive to the interruption is employed to operate a counting and shaking circuit.

The caps proceed from the unit 34 into chutes 38 and 40 which direct the caps into the containers at the shaker units 12 and 14, respectively. Operation of the gate unit 34 determines whether the flow of caps is through chute 38 or chute 40. The arrangement is such that upon a predetermined count by the electronic apparatus connected with the lamp-photocell unit 36 the gate unit 34 will shift the flow of caps from one chute to the other.

The shaker units 12 and 14 may be identical in all respects and further description will be made only of unit 12. This unit comprises a base 42 mounted for rocking movement about stub shafts 44 and 46. Extending upwardly from the base 42 are corner angle members 48 which serve to retain a carton or similar receptacle 50 shown in chain lines in Figure 1. Adjacent one end of the base 42 there is provided a pneumatically operated shaking device 52 having an extended piston rod 54 connected with the base 42. The arrangement is such that when air under pressure is delivered to the device 52 the piston rod 54 will be rapidly moved up and down through a short stroke to shake the carton 50. This arrangement is shown only generally in this application because further details may be fully understood by reference to United States Patent 2,304,982 to Wilckens.

Referring now to the other figures of the drawing in addition to Figure 1, further details of the handling mechanism 10 may be understood. In Figure 2 a view similar to that in Figure 1 is shown except that a front panel shown in Figure 1 covering the lower portion of the mechanism is removed from Figure 2. Accordingly, it will be observed that the upstanding frame 20 generally consists of a casting or the like having side walls 56 with ribs such as 58 and 60 integral therewith to form various supporting surfaces. With additional reference to Figure 4 it will be observed that the framework 20 is also provided with a curved ring-like rib 62 at the front surface of the mechanism and extending between the side walls 56. The ring 62 has provided therein a recessed portion 64 which continues in side walls 56 and across the top 57 of the framework 20 to provide a complete circular recess for receiving a front bearing plate 66 on which a large diameter ball bearing 68 is mounted. The rear of the framework 20 is similarly provided with an annular recess 70 for receiving a rear bearing plate 72 on which a ball bearing 74 is mounted.

The ball bearings 68 and 74 generally define the previously mentioned opening 26 through which caps are introduced into the hopper 22, and these bearings serve to rotatably support the rotatable hopper 22 which carries the permanent magnets 24.

In greater detail, the rotatable hopper 22 is in the form of two dish-shaped hopper dials 22a and 22b forming the front and rear, respectively, of the hopper 22. Each dial has formed therein a recess 78 which receives the inner ring 80 of ball bearing 68 or 74. The rings 80 are retained in recesses 78 by means of retaining rings 82 secured to hubs 76 of the dials by means of bolts 84.

The outer rings 86 of the ball bearings are retained on the bearing plates 66 and 72 by providing a recess 88 in the plates and further providing a clamping ring 90 for each dial having a recess 92 and retained against the panel by means of bolts 94.

The dials 22a and 22b differ only in the construction of a rim portion at the outer periphery thereof. Referring to dial 22a the rim portion 95 is characterized by a plurality of apertures 96 in which the magnets 24 are fitted as by a press fit or the like.

The magnets 24 may be of any suitable material which may be readily magnetized and which will retain a high concentration of magnetization. Preferably these magnets will be alternately mounted as regards their N and S poles.

The rim portion 97 of dial 22b is similar in exterior shape to that of dial 22a but no provision need be made for receiving magnets. That is, it is sufficient that only one of the dials carry permanent magnets.

The hopper dials 22a and 22b are each further characterized by provision of hopper liners 98. These liners are of dish shape somewhat similar to the dials 22a and 22b. These liners may be clamped to the hubs 76 of the dials by means of retaining rings 100 and bolts 102. An outer annular area of each of the dials is characterized by being flared out at a point 104 to provide a rim area 106 which is in a plane perpendicular to the axis of rotation of the hopper dials. These rims are backed by facing edges of hopper dial rims 95 and 97. As can be clearly understood with reference to Figure 6, the inner surfaces of rims 106 of the liners 98 are spaced apart slightly more than the depth of the caps C thus forming a channel in which the caps will lie.

The liners 98 may be made of any suitable material. Usual non-magnetic material such as brass may be employed, and it has been found that the magnetic fields of the magnets 24 are not adversely affected by use of stainless steel such as that commonly referred to as type 302 of gauge No. 22.

The hopper dials 22a and 22b together with the liners 98 are driven in unison (although not necessarily in absolute synchronism) by means of a dual pulley 108 attached to the shaft 110 of motor 28. The pulley 108 drives two belts 30a and 30b. As may be best observed in Figure 2 belts 30a and 30b are directed from pulley 108 upwardly and over an idler take-up pulley 112, then over a first guide pulley 114, then over the outer surfaces of the rims 95 and 97 of the hopper dials 22a and 22b, then over second guide pulleys 116 and back to pulley 108. Inasmuch as the guide pulleys 114 and 116 are positioned above the position of a horizontal line which would be tangent to the lowermost point of the dials 22a and 22b, the normally outer or flat surfaces of the V belts 30a and 30b are tensioned against the rims of the hopper dials and therefore cause the dials to rotate. By this arrangement it is unnecessary to have belts of sufficient length to proceed completely around the hopper dials. It will be appreciated from the apparatus as thus far described that the hopper dials are driven in a manner such as that shown rather than having a direct mechanical connection between the dial rims because it is necessary, as will be described more fully below, to have the ejector assembly 32 project into the channel between the rim areas 106 of the hopper liners 98. The dials may be mechanically interconnected near the centers by means of spiders or the like arranged to clear the ejector 32. However, this structure is not preferred since there may be some interference with entering caps.

Th idler take-up pulley 112 may be mounted on an arm 118 which in turn may be pivotally mounted on a shaft 120 and resilient bias may be applied to the shaft 120 by any convenient means.

To retain the caps C within the channel formed by rim areas 106 of the hopper liners 98, there is provided a cap retaining ring or arcuate strip 122. This ring extends around the hopper 22 in a position corresponding to that shown in Figure 6 except for the place where the ejector assembly 32 projects into the hopper and also at a point just "forward" of the ejector where the ring 122 diverges inwardly in a manner to be described.

As best shown in Figure 6, the ring 122 may have an outer body 124 which may be of substantial thickness to provide rigidity and the inner portion 126 of the ring may be bevelled to provide a relatively narrow inner edge 128 for retaining the caps. The edge 128 may be substantially centered between the portions 106 of liners 98 or may be positioned closer to the dial 22a side, depending on the particular configuration of the articles being handled. In the case of caps C of the crown type, as illustrated in Figure 6, the edge 128 will preferably by slightly closer to the dial 22a side inasmuch as the channel in which the caps lie is somewhat wider than the depth of the crowns to prevent binding of the caps in the channel. In view of this fact and further because the crown will be attracted as close as possible to the magnet the edge 128 must be closer to the magnet side to prevent the skirt of the cap from riding on the edge 128. As will be explained more fully below, it is also possible and permissible for caps of the crown type to come through the hopper facing in either direction. That is, the magnets 24 set up a sufficient magnetic field to attract and retain the caps no matter if the top of the cap or the skirt of the cap is facing the magnet. In the latter instance, the skirt of a crown-type cap will lie to the left of the retaining ring edge 128 as viewed in Figure 6 and again the skirt will not ride on the edge.

The magnets 24 exert a powerful centering force on the caps and therefore, as viewed in Figure 6, caps properly centered will normally not rub against edge 128 of ring 122. However, in the event that a cap for some reason is not properly centered, the ring 122 prevents centrifugal force from throwing the cap out of the hopper.

From the apparatus as thus far described, it will be apparent that whenever a supply of caps is poured into the hopper 22 through opening 26 the caps will fall to the lower portion of the hopper and eventually all of the caps by action of gravity and the agitation created by rotation of the hopper will fall into position as shown in Figure 6, it being understood that the direction in which the caps face is immaterial.

Normally by the time caps attracted to the magnets and properly in position in the cap retaining channel between liner rims 106 have proceeded upwardly into the upper left hand quadrant of the hopper as viewed in Figures 1, 2 and 5 there will be but a single cap centered over each magnet and the other caps will have fallen downwardly into the hopper to be eventually positioned within the channel. However, due to the strong influence of the magnets, it may sometimes happen that one or more of the caps will adhere to a properly positioned cap to form a chain of caps. To break up such chains it has been found that the ring 122 may be diverged inwardly so that the inner edge 128 of the ring 122 is at a point substantially opposite the centers of the passing magnets. This point is designated 130 in Figure 5, and the position of a cap C is illustrated. By so diverging the ring 122 inwardly, the magnetic attraction of the magnets will remain sufficient to retain the caps which were substantially centered but the reduced magnetic influence will not be sufficient to maintain other caps in engagement with the first cap. However, as previously stated, there is a powerful centering action by the magnets and the first cap will immediately be repositioned over the magnets as soon as the magnet has passed the point 130 and the ring has diverged outwardly to its normal position. For various types of articles, the degree of inward divergence of ring 122 will depend upon the shape of the article.

The position of point 130 of ring 122, as shown in Figure 5, may be further understood with reference to Figure 7, showing a cross-section at point 130. Figure 7 also shows a convenient manner of mounting the ring 122. This is by means of a protrusion 132 extending inwardly from the frame 20 to which the ring 122 may be secured by means of bolts 134. This type of connection may be repeated as necessary about the circumference of the hopper.

The construction and operation of the ejector assembly 32 will now be described in detail. Referring primarily to Figures 5 and 10 the ejector consists of a central relatively thin blade 136 which is supported between side plates 138 and 140. The blade 136 is slightly larger in profile than the plates 138 and 140 at least at the top edge 142 of blade 136 and this top edge is placed in a horizontal position and at a point relative to the magnets 24 so that the lower edges of the caps centered over the magnets will pass immediately above the edge 142. Therefore, as the magnets continue to move with the hopper dial 22a, a cap will ride along the edge 142 and, due to its tangential velocity will be projected along the edge 142 in a horizontal direction to the right, as viewed in Figure 5. The position of a cap riding on the edge 142 may be best understood with reference to Figure 10.

The maximum thickness of the blade 136, together with the side plates 138 and 140, must, of course, not exceed the spacing between the inner faces of rim areas 106 of the hopper liners 98.

For purposes of illustration the positions of the magnets 24 are indicated in chain line in Figure 5.

The plates 138 and 140 of ejector 32 are secured together with the blade 136 therebetween by means of flat head screws 146.

Continuing to refer to Figures 5 and 10 the ring 122 begins at a point 148 which is below the lower edge of the ejector assembly 32 and the ring terminates at a point 150 somewhat in advance of the leading end of the ejector assembly. Between the termination point 150 and the beginning 148 there is first provided a gate 152 pivotally mounted about a transverse pin 154. This gate is provided so that if a jam of caps should occur in the vicinity of the ejector 32 the gate may be opened upwardly against the bias of a suitable spring so that the jam may be cleared. The cross section of the gate 152 may be substantially as the cross section of ring 122 and may be further understood with reference to Figure 8, where the gate is shown as made up of a central plate 156 with side plates 158 and 160.

Just following the gate 152 there is provided an upper guide blade 162 having a lower edge 164 as shown in Figure 10 which acts in similar fashion to the upper edge 142 of ejector blade 136. Blade 162 is positioned between side plates 166 and 168. Accordingly, there is provided a horizontal channel defined by the upper edges of members 136, 138 and 140 and the lower edges of members 164, 166 and 168 for directing the caps through the previously mentioned gating unit 34. As may be best understood in Figure 9, beyond the confines of the rim areas 106 of the hopper liners 98, the sides of the channel extending into the gating unit 34 are defined by side plates 170 and 171.

Side plates 170 and 171 are in the form of C-channels having lower flanges 172 and upper flanges 173 which merge into curved side plates 174 and 175. Plates 174 and 175, best shown in Figure 8, are secured to the top 57 of frame 20 by means of bolts 176. The top 57 is provided with an elongated aperture 177 to receive the assembly defined at its extreme outer surfaces by plates 170 and 171. A suitable cover plate may be provided for aperture 177 if desired.

Referring to Figures 5 and 9 the side plates 170 and 171 are provided with elongated apertures 170' and 171' through which the operator may observe and dislodge any possible jams of caps.

As shown in Figure 9, side plates 170 and 171 are also provided with circular apertures 178 and 180, respectively, through which a beam of light may be focused. The light beam may be generated by means of lamp 182 within a suitable housing 184. A suitable lens system 186 is employed to focus a beam of light from lamp 182 through the apertures 178 and 180 to a second lens system 188 which concentrates the light of the beam on a photoelectric cell 190 within a suitable housing 192.

Accordingly, as each cap passes the openings 178 and 180 the light beam will be interrupted and this interruption may serve to actuate a counting apparatus. The particular counting apparatus is not a subject of this particular invention and, therefore, is not described in detail herein. However, a suitable counting arrangement is disclosed and claimed in the previously mentioned copending application Serial No. 234,872. Inasmuch as the apertures 178 and 180 are located above the line along which the centers of the caps will proceed it will be apparent that there will be an interruption and restoration of the light beam for the passing of every cap notwithstanding that the caps may be proceeding one immediately after another.

The gate unit 34 will now be described in detail. Referring primarily to Figures 5, 8 and 9, this unit consists of a box-like guide 200 mounted on a vertical post 202 which is mounted for pivotal movement in a bearing housing 204 which is fixedly mounted on the base 206 of solenoid housing 208.

The housing 208 is secured as by bolts 210 to the upper flanges 172 of the just described structure forming the channel through which caps pass between the lamp and photocell.

The post 202 is provided with a reduced section 212 at its upper end which is threaded at its upper extremity to receive a retaining nut 214. Surrounding the extended portion 212 of post 202 and keyed thereto is an operating arm 216 bifurcated at its end 218 remote from the post 202. The bifurcated portion designated as 220 is arranged to receive an operating stud 222 which extends upwardly from a transverse tie link 224. As best shown in Figures 8 and 9, the tie link 224 is connected by means of transverse pins 226 and 228 to the operating arms 230 and 232, respectively, of solenoids 234 and 236. Accordingly, it will be understood that upon the energization of solenoid 234 the guide box 200 will swing to direct the flow of caps into chute 40. Then upon energization of solenoid 236 the guide 200 will swing to deliver the flow of caps to the chute 38. The panels which divide the chutes 38 and 40 adjacent the gate 200 will be in line with the chain line 238 in Figure 8.

From the foregoing it will be also understood that the end of the guide box 200 adjacent the post 202 will be substantially centered over the channel between the plates 170 and 171 through which the caps proceed past the lamp-photocell arrangement. Therefore, caps issuing from the channel will be directed into the guide box 200 and will be diverted into the particular chute to which the guide 200 is directed.

The chutes 38 and 40 may be conveniently supported on the framework 20 by means of a triangular bracket 240 mounted by means of bolts 242 on bosses 244 and 246 extending from the side of the framework 20.

The complete mechanism may be adapted for steerable movement by providing rear rollers 18' pivoted at 246' to permit rollers 18' to caster.

Inasmuch as the counting capacity of counting circuits such as that described in the just-mentioned copending application is extremely high, going up to several thousand counts per second, the output rate of the handling apparatus 10 can be extremely high and yet not exceed the capacity of the counter circuits. The present invention is well suited for use with such high capacity circuits because there is no limit to the speed of cap output except that imposed by centrifugal forces, which may be held within predetermined limits by increasing the diameter of the hopper so that the number of caps per circumferential unit of length is increased.

The apparatus of the present invention is also unique in that the caps upon falling into the rotating hopper are automatically tumbled until they fall into correct position. This action renders unnecessary separate agitating devices known in prior art machines.

The terminology used in the specification is for the purpose of description and not of limitation, the scope of the invention being indicated by the claims.

We claim:

1. In article handling apparatus for assembling articles in flow line formation, a circular hopper assembly mounted for rotation about a substantially horizontal axis, means for rotating the hopper, the hopper assembly comprising two coaxial plate-like elements each dished to include a central recess in one face and a surrounding radially extending peripheral edge portion, said elements being independently mounted for rotation about said axis with their recessed faces opposed and with said peripheral edge portions spaced apart to form an article receiving channel, the peripheral edge portion of at least one of the elements being provided with magnetic means for retaining articles in predetermined position in the channel, and stripper means projecting into the hopper channel for removing articles therefrom in said line formation.

2. An article handling apparatus of the character described in claim 1 wherein the means for rotating said hopper assembly includes a pair of belts, one engaging each of the respective plate-like elements.

3. An article handling apparatus of the character described in claim 1 including a stationary arcuate strip extending about and outwardly of the path of movement of the hopper channel.

4. In article handling apparatus for assembling metal articles in flow line formation, a base, a circular hopper mounted for rotation on said base about its axis, said hopper including a circular face concentric with and spaced radially from its axis, a series of magnetic elements spaced circumferentially along said face for magnetically retaining articles thereon, stripper means carried by said base to lie parallel to said face to remove articles from said magnetic elements, an outfeed chute aligned with said stripper mean to receive articles removed by the latter, and a member fixed to said base in the bath of rotation of said magnetic elements at a point in advance of said stripper means to momentarily uncenter articles adhering to said magnetic elements.

5. Apparatus of the character described in claim 4 wherein said face lies in a plane radial of the axis of rotation of the hopper.

6. Apparatus of the character described in claim 4 wherein said member is of angular form and has its apex facing the hopper axis at a point intermediate the course followed by said magnetic elements.

7. Apparatus of the character described in claim 6 wherein the hopper rotates about a horizontal axis and said member is positioned above said axis.

8. In an article handling apparatus for assembling articles in flow line formation, a hopper including two axial ends and two opposed intermediate portions having circumferential flat opposed rims, means to support the hopper for rotation about a substantially horizontal axis with said ends spaced along said axis, means for rotating the hopper, the hopper being provided with a loading aperture adjacent each axial end thereof for receiving articles, said flat rims of the hopper forming a continuous channel open to the interior of the hopper for receiving articles from the hopper interior and open to at least a portion of the exterior of the hopper for removing articles in line therefrom, means mounted for rotation with said hopper and fixed to at least one of the flat rims to retain articles in the hopper channel, and stripper means fixed to said hopper supporting means and projecting into the hopper channel for removing articles outwardly of said channel exteriorly of the hopper in line formation during rotation of the hopper.

9. In article handling apparatus for assembling metal articles in flow line formation, a hopper including two axial ends and two opposed conical intermediate portions having circumferential flat opposed rims, means to support the hopper for rotation about a substantially horizontal axis, means for rotating the hopper, the hopper being provided with a loading aperture adjacent each axial end thereof for receiving articles, said flat rims of the hopper forming a continuous channel open to the interior of the hopper for receiving articles from the hopper interior and open to at least a portion of the exterior of the hopper for removing articles in line therefrom, magnetic means mounted on at least one of the flat rims for magnetically retaining articles in the channel, and stripper means fixed to said hopper supporting means and projecting into the hopper channel for removing articles outwardly of said channel exteriorly of the hopper in line formation during rotation of said hopper.

10. An article handling apparatus of the character described in claim 9 wherein said stripper means is positioned above the hopper axis.

11. In apparatus for arranging in flow line formation metal caps including a skirt having a serrated edge, a hopper including two axial ends and two opposed conical intermediate portions having circumferential flat opposed rims, means to support the hopper for rotation about a substantially horizontal axis, means for rotating the hopper, the hopper being provided with a loading aperture at each axial end thereof for receiving the metal caps, said flat rims of the hopper forming a continuous channel open to the interior of the hopper for receiving caps from the hopper interior and open to at least a portion of the exterior of the hopper for removing caps in line therefrom, magnetic means mounted on at least one of the flat rims for magnetically retaining caps in the channel, and stripper means fixed to said hopper supporting means and projecting into the hopper channel for removing caps outwardly of said channel exteriorly of the hopper in line formation during rotation of said hopper, said stripper means including a strip provided with an edge adapted to contact with the skirt of each cap.

References Cited in the file of this patent

UNITED STATES PATENTS

| | | |
|---|---|---|
| 962,030 | Kirkegaard | June 21, 1910 |
| 1,161,577 | Alberti et al. | Nov. 23, 1915 |
| 2,394,200 | Nelson | Feb. 5, 1946 |
| 2,440,846 | Cannon | May 4, 1948 |
| 2,463,807 | Robins et al. | Mar. 8, 1949 |
| 2,487,265 | Nelson | Nov. 8, 1949 |
| 2,515,965 | Nurnberg | July 18, 1950 |
| 2,523,517 | Potter | Sept. 26, 1950 |